(12) United States Patent
Bemben

(10) Patent No.: US 6,907,693 B1
(45) Date of Patent: Jun. 21, 2005

(54) PORTABLE GARDENING STATION

(76) Inventor: Kelly Bemben, 1059 Nanaimo Street, New Westminster, British Columbia (CA) V3M 2E7

( * ) Notice: Subject to any disclaimer, the term of this patent is extended or adjusted under 35 U.S.C. 154(b) by 0 days.

(21) Appl. No.: 10/813,045

(22) Filed: Mar. 31, 2004

(51) Int. Cl.[7] ............................................. A01G 31/02
(52) U.S. Cl. ........................................................ 47/65
(58) Field of Search ..................... 119/15, 33

(56) References Cited

U.S. PATENT DOCUMENTS

| | | | | |
|---|---|---|---|---|
| 1,970,727 | A | * | 8/1934 | Bates ......................... 110/240 |
| 3,129,653 | A | * | 4/1964 | Kertesz ..................... 99/421 R |
| 4,276,720 | A | * | 7/1981 | Lyon .............................. 47/39 |
| 4,335,897 | A | | 6/1982 | Muller, Jr. |
| D321,579 | S | * | 11/1991 | Ayres .......................... D34/26 |
| 5,168,586 | A | * | 12/1992 | Small ............................. 4/597 |
| 5,186,479 | A | * | 2/1993 | Flowers ................... 280/47.35 |
| D355,515 | S | * | 2/1995 | Spear et al. ................. D34/16 |
| 5,449,083 | A | | 9/1995 | Dougherty et al. |
| 5,502,848 | A | | 4/1996 | Cowan |
| 5,509,681 | A | | 4/1996 | Keller |
| 6,029,398 | A | * | 2/2000 | Sporer ........................... 47/65 |
| D455,193 | S | | 4/2002 | Moulson |
| 6,434,882 | B1 | | 8/2002 | Becker |
| 6,622,425 | B2 | * | 9/2003 | Shepherd ........................ 47/17 |
| 6,625,924 | B2 | | 9/2003 | Lundgren |
| 2003/0084610 | A1 | | 5/2003 | Yawney et al. |

FOREIGN PATENT DOCUMENTS

| | | | | |
|---|---|---|---|---|
| AU | 9944829 A | * | 3/2001 | ............ A01G 9/02 |
| EP | 210702 A1 | * | 2/1987 | .......... A01G 31/02 |

* cited by examiner

Primary Examiner—Peter M. Poon
Assistant Examiner—Francis T. Palo
(74) Attorney, Agent, or Firm—Vermette & Co.

(57) ABSTRACT

A portable gardening station comprising a bed for containing a growing medium. The bed has a base comprising a shoulder, a trough, and a raised center portion, wherein the trough is lower than the shoulder and raised center portion. The underside of the bed is reinforced with structural ribs to provide sufficient rigidity so that the base does not deflect under the weight of the growing medium. The gardening station has a perforated growing medium baseplate which is supported by the shoulder and raised center portion of the base. The baseplate is operative to support the growing medium and to allow water to drain from the growing medium through the baseplate and into the trough. The trough has a drain to allow water from the growing medium to exit the gardening station. The gardening station is supported by a structural assembly.

8 Claims, 6 Drawing Sheets

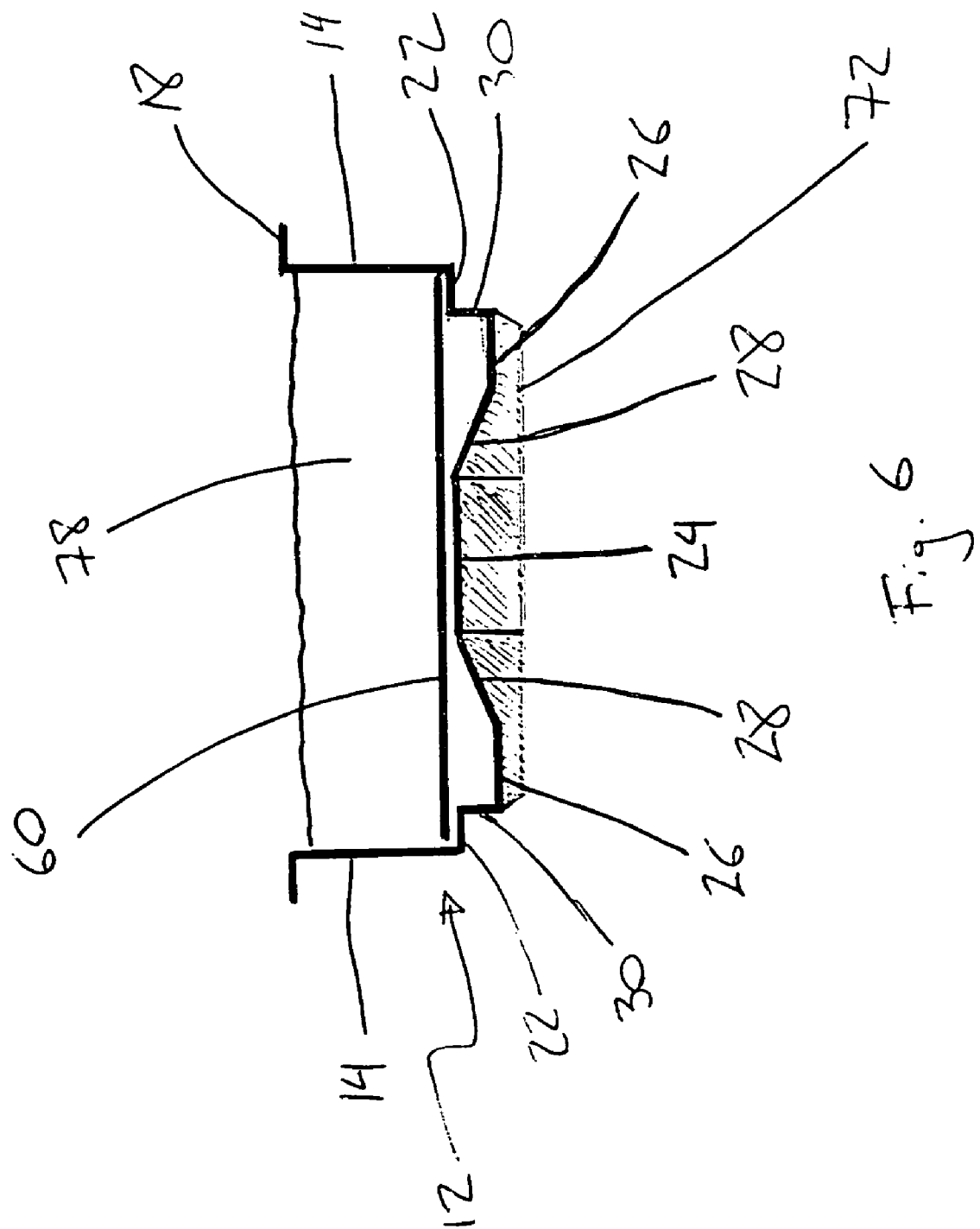

US 6,907,693 B1

PORTABLE GARDENING STATION

FIELD

The invention relates to the field of gardening.

BACKGROUND OF THE INVENTION

Gardening is a popular activity practiced by millions of people worldwide. However, for many who live in urban areas, gardening is simply not an option because of the lack of space. In addition, many people are unable to garden because of age, disability, or weather. Although such people may have the option of tending plants in flower-pots and planters on window sills and the various other surfaces in their places of residence, such planters are generally small, permanent fixtures that often obstruct the window in which they are located. It would be advantageous if people could garden year round whether or not they have a garden and irrespective of their age, disabilities, or outdoor conditions.

U.S. patent application Ser. No. 10/315,817 filed by Yawney et al., attempts to address some of these concerns, however, the mobile gardening station of Yawney suffers from several drawbacks. Firstly, the gardening station of Yawney is relatively complex in construction and cannot be easily shipped or assembled. Further, the shell insert of Yawney must be made of a relatively thick plastic or metal (i.e. expensive and/or heavy) to prevent sagging under the weight of the soil and plants. Sagging of the shell insert of Yawney obstructs the space thereunder and results in poor drainage. Finally, the gardening station of Yawney is not adjustable.

Accordingly, it is an object of the present invention to provide a simple, light portable gardening station with good drainage that is easily shipped, moved and installed. If is a further object of the present invention to provide a gardening station that is adjustable such that it can used comfortably by old or disabled people and such that it can fit a variety of gardening "areas" (e.g. patios, kitchens, garages, etc.).

SUMMARY OF THE INVENTION

A portable gardening station comprising a bed for containing a growing medium. The bed has a base comprising a shoulder, a trough, and a raised center portion, wherein the trough is lower than the shoulder and raised center portion. The trough is sloped downwards and a drain hole is located at the lowest part thereof. The underside of the bed is reinforced with structural ribs to provide sufficient rigidity so that the base does not deflect under the weight of the growing medium. This ensures that the trough remains clear and water can be drained from the growing medium effectively. The gardening station further comprises a porous growing medium baseplate which is supported by the shoulder and raised center portion of the base. The porous growing medium baseplate is operative to support said growing medium and to allow water to drain from the growing medium through the baseplate and into the trough. The gardening station is supported by a structural assembly.

In a preferred embodiment the structural assembly comprises horizontal members, on which the shoulder of the bed is supported, and a plurality of legs. The legs are preferably extendible so that the height of the gardening station can be adjusted according to the preference of the user.

The gardening station may include a support assembly which is used to support gardening accessories above the growing medium (e.g. a greenhouse type covering, lights, misters, etc.). The support assembly may be attached directly to the structural assembly and is preferably extendible so that its precise configuration (e.g. height) can be determined by the user.

A hose or pipe can be connected to the drain hole so that water drained from the growing medium can be transported away from the gardening station for disposal or reuse.

BRIEF DESCRIPTION OF THE DRAWINGS

Further features and advantages will be apparent from the following detailed description, given by way of example, of a preferred embodiment taken in conjunction with the accompanying drawings, wherein:

FIG. 6 is a cross-section of the bed of the portable gardening station.

DETAILED DESCRIPTION OF THE INVENTION

Figure 1:
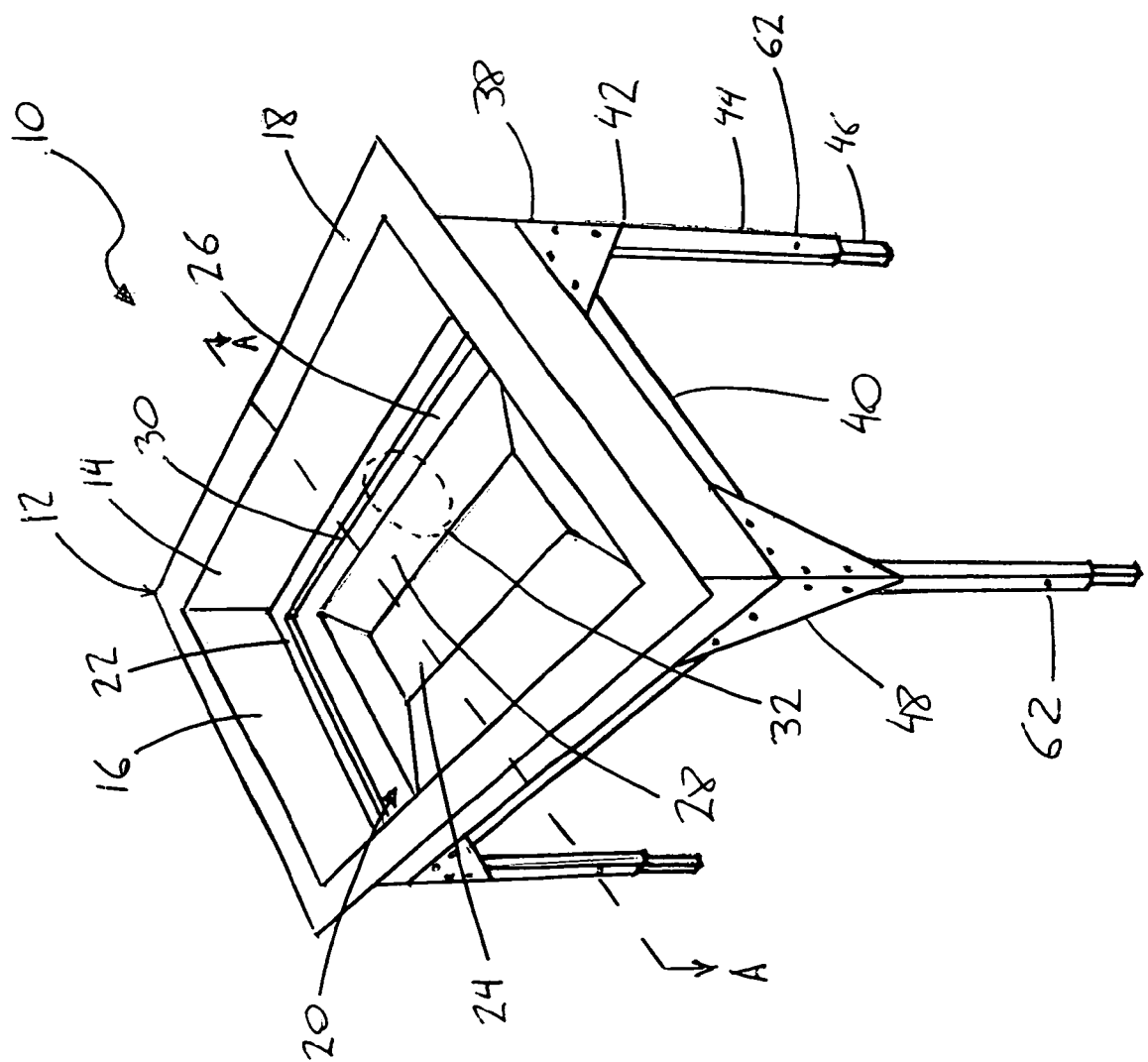
FIG. 1 is a perspective view of the portable gardening station.

Referring to FIG. 1, a perspective view of the gardening station 10 is shown. Referring to FIG. 6 a cross-section through dashed line A—A of the bed 12 of FIG. 1 is shown. Referring to both FIGS. 1 and 6, the gardening station 10 comprises a bed 12 supported by a structural assembly 38. The bed 12 is comprised of a base 20 from which sidewalls 14 and endwalls 16 extend upwardly. The upper limit of the sidewalls 14 and endwalls 16 is defined by a lip 18. The lip 18 is a flat surface on which a person may lean or place tools, etc., while using the gardening station. The outer edge of the lip 18 is preferably rounded down to eliminate sharp corners.

The outer portion of the base 20 forms a shoulder 22. Inside and adjacent to the shoulder 22 is a trough 32 defined by vertical face 30, floor 26 and sloped face 28. Water from the contents of the bed 12 drain into and are collected in the trough 32, which is the lowest portion of the bed 12. Sloped face 28 extends upwardly from the floor 26 of the trough 32 to the raised central portion 24 of the bed.

The growing medium baseplate 60 is supported by the shoulders 22 and the central raised portion 24. It is essential that the baseplate 60 have proper support in order to avoid sagging, which would interfere with drainage of the growing medium 78 (the space between the trough 32 and the baseplate 60 would be occluded by the sagging baseplate). Water from the growing medium 78 drains through the baseplate 60 and into the trough defined by sloping face 28, floor 26 and vertical face 30. The structural ribs 72, which provide rigidity (i.e. to prevent sagging of the base 20 and baseplate 60) and support to the bed 12, are shown beneath the bed 12.

Referring to FIG. 1, the bed 12 is supported by a structural assembly 38 comprising horizontal members 40 and legs 42. The horizontal members 40 and legs 42 are connected at the corners of the gardening station 10 by plates 48. The legs 42 each comprise an outer sleeve 44 and an inner sleeve 46 and are telescopically extendible such that the height of the gardening station may be adjusted. The legs 42 each additionally comprise a locking mechanism 62 to lock the leg 42 at a selected height. The height of the gardening station 10 can be adjusted by adjusting the length of the legs 42 to suit individual users or to accommodate the aesthetics of the surroundings.

Alternative embodiments of the gardening station will be readily apparent to those skilled in the art wherein, for example, the legs 42 are hingedly connected to the horizontal members 40 so that the legs 42 can be folded for shipment or storage of the gardening station 10.

Figure 2:
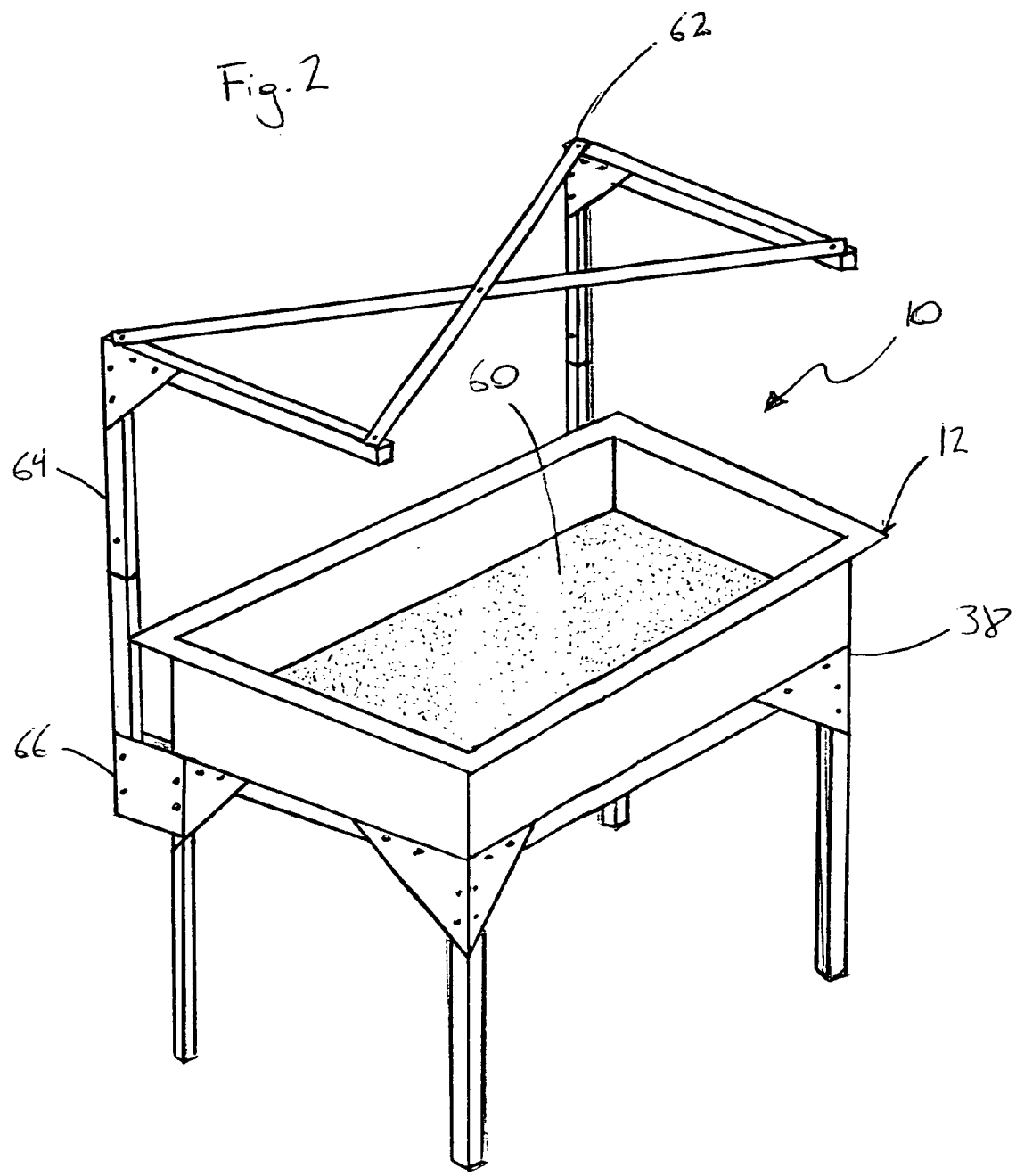
FIG. 2 is a perspective view of the portable gardening station with light holder assembly.

Referring to FIG. 2, a perspective view of the gardening station 10 is shown. In the bed 12 is shown a growing medium baseplate 60, which rests on the shoulder 22 (see FIG. 1) and the raised central portion 24 (see FIG. 1). Also shown is a support assembly 62. Support assembly 62 comprises telescopically adjustable vertical members 64, which are connected to the structural assembly 38 by rectangular plates 66. The support assembly 62 can be used to hold lights, misters, and other gardening devices.

Referring to FIGS. 1 and 2, the growing medium baseplate 60 is supported by the shoulder 22 and raised central portion 24 of the base 20. Water from the growing medium is collected in the space between the trough 32 and the medium growing baseplate 60. The growing medium baseplate 60 is a removable perforated thin rigid barrier which supports the growing medium but allows water to pass through.

Referring again to FIGS. 1 and 2, in an alternative embodiment of the invention the plates 48 each comprise a one piece component having three triangular faces (each face being perpendicular to the other two) which together form an approximately tetrahedral shape. Each of the edges between adjacent faces comprises a sleeve for slidably receiving either a leg 42 or a horizontal member 40.

Figure 3:
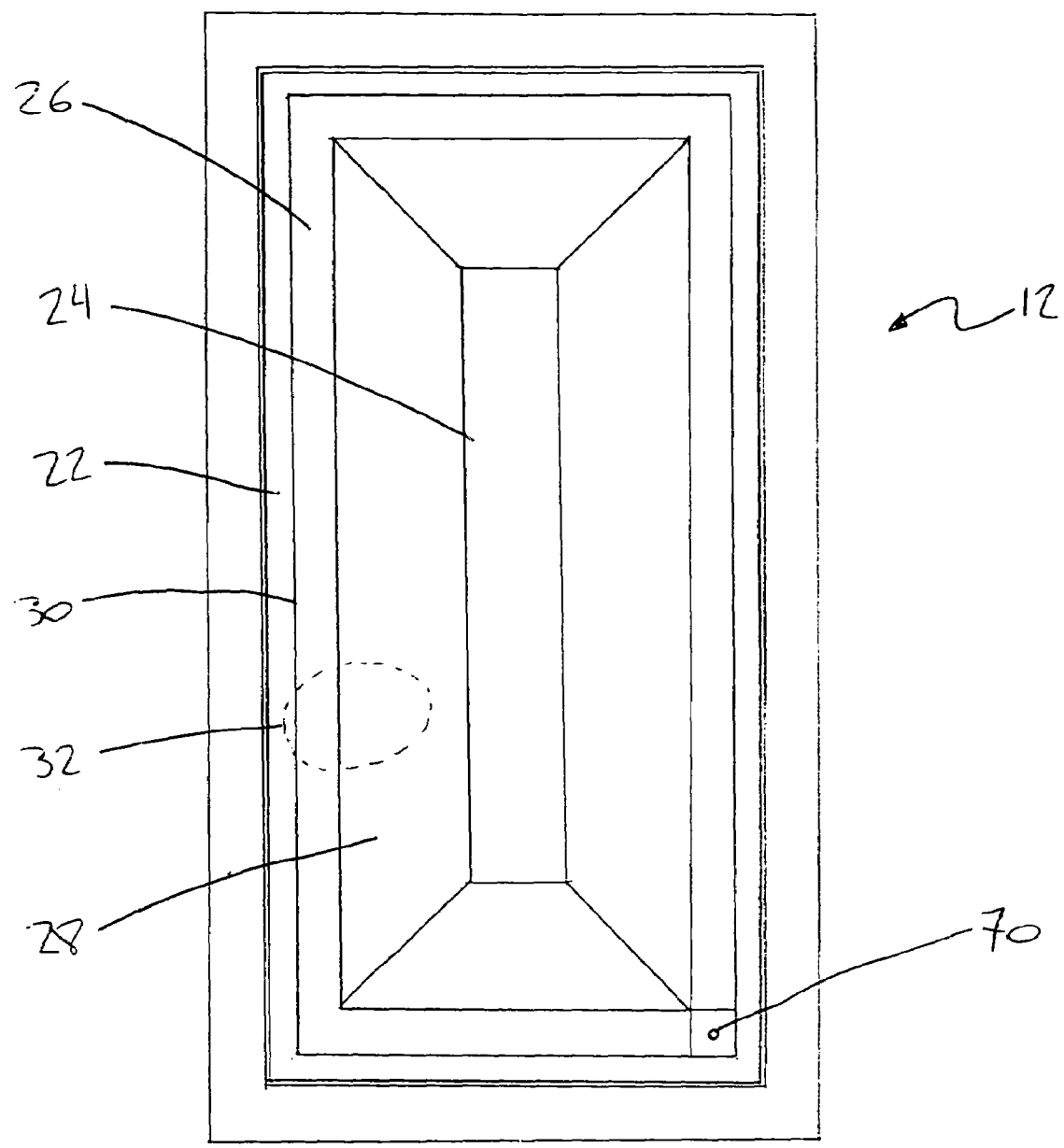
FIG. 3 is a top view of the bed of the portable gardening station.

Referring to FIG. 3, a top view of the bed 12 of the present invention is shown. Referring to FIGS. 1 and 3, the shoulder 22 and raised central portion 24 are the points on which the growing medium baseplate (not shown) is supported. Between the shoulder 22 and raised central portion 24 is a trough 32, defined by vertical portion 30, floor 26 and sloped face 28. The floor 26 of the trough 32 is generally sloped downwards toward the drainage hole 70 such that the drainage hole 70 is at the lowest point of the bed 12. The highest point of the floor 26 is in the corner of the bed 12, which is opposite the drain hole 70 (the highest point of the floor 26 still being lower than the shoulder 22 and raised central portion 24).

In an alternative embodiment of the bed 12, the floor of the trough 32 is sloped towards the drainage hole 70 in a spiral manner such that the highest point of the floor 26 is directly adjacent to the lowest point (i.e. water drained from the growing medium will flow in an approximately circular path around the central raised portion 24 from the highest point of the floor 26 toward the drain hole 70).

Figure 4:
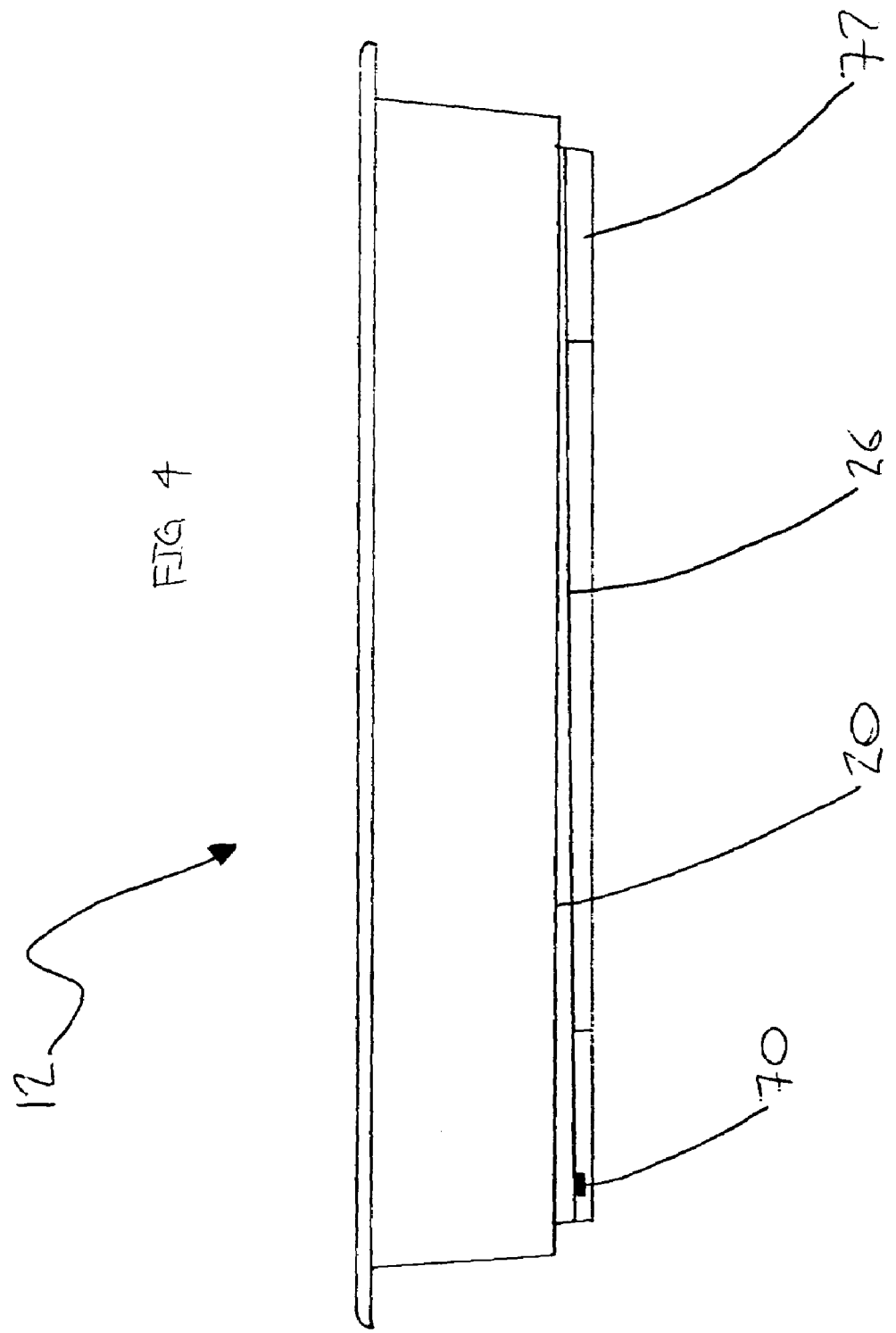
FIG. 4 is a side view of the bed of the portable gardening station.
Figure 5:
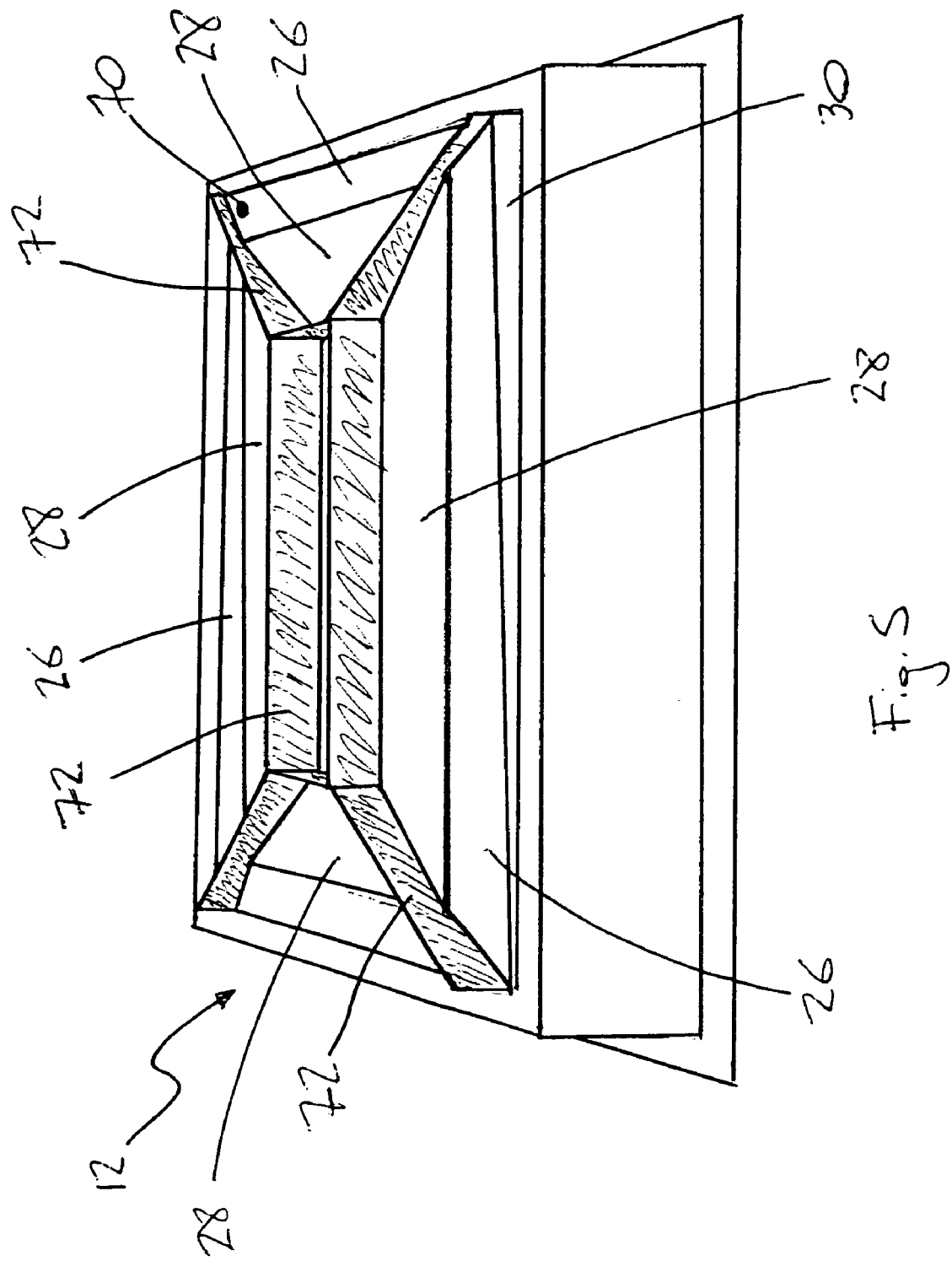
FIG. 5 is a perspective view of the bottom of the bed of the portable gardening station.

Referring to FIGS. 4 and 5, a side view and a bottom perspective view of the bed 12 are shown, respectively. The underside of the bed 12 is supported by structural ribs 72. The structural ribs provide rigidity to the bed 12 thereby enabling it to support the weight of the baseplate 60 and growing medium 78 (see FIGS. 2 and 6). The use of structural ribs 72 allows the bed 12 to be made of relatively thin material, resulting in a lighter and cheaper portable gardening station. Apart from the structural ribs 72 the floor 26 is the lowest part of the bed 12. The lowest part of the floor 26 is found at the drain hole 70 (as discussed above, the highest point of the floor 26 is found in the corner opposite the drain hole).

Referring to FIGS. 1, 3, 4, 5 and 6, the lower portions of the sidewalls 14 and endwalls 16, the shoulder shoulder 22, and vertical portion 30 in combination cooperate to rigidify the perimeter of the bed 12. The rigidity provided by the walls, shoulder, vertical portion and the structural ribs 72 enables the base 20 of the bed 12 to support the weight of the baseplate 60 and growing medium 78 without significant deflection.

Referring to FIGS. 2, 4 and 5, a hose or pipe may be connected to the drain hole 70 to carry away liquids drained from the bed 12 of the gardening station.

Referring to FIGS. 1, 2 and 6, in an alternative embodiment the growing medium baseplate 60 is not used, and the trough 32 is filled with a particulate or aggregate base layer through which water is drained from the growing medium 78.

Referring to FIGS. 1 and 2, the components of the structural and support assemblies 38, 62 are easily assembled and disassembled. Therefore, when the gardening station 10 is manufactured, shipped or sold, the components of the support and structural assemblies 38, 62, can be compactly packaged and, for example, placed in the bed 12, thereby resulting in space savings. Alternatively, a plurality of beds can be stacked one on top of the other and the components of the structural assemblies can be packaged separately.

Referring to FIGS. 4, 5 and 6, numerous alternative configurations of the structural ribs 72 will be readily apparent to the skilled worker. For example, a series of parallel structural ribs extending one side to the other across the bottom of the bed 12. Alternatively, a gridded pattern of structural ribs could be employed. The essential aspect of the structural ribs is that they provide sufficient rigidity to the base of the bed to support the baseplate 60.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A portable gardening station comprising:
   a) a bed for containing a growing medium, said bed having a base comprising a shoulder, a trough, and a raised center portion, said trough being lower than said shoulder and said raised center portion, wherein said trough is sloped relative to said shoulder and said trough having a low point toward which water drains, wherein a drain hole is located at said low point, and wherein an underside of said bed comprises structural ribs;
   b) a perforated growing medium baseplate supported by said shoulder and said raised center portion of said base, said perforated growing medium baseplate operative to support said growing medium and to allow water to drain from said growing medium through said baseplate and into said trough; and
   c) a structural assembly for supporting said bed; wherein said structural ribs provide said base with sufficient rigidity such that said base does not deflect significantly under the weight of said baseplate and growing medium.

2. A portable gardening station according to claim 1, wherein said structural assembly comprises a plurality of telescopically adjustable legs.

3. A portable gardening station according to claim 1, further comprising a support assembly coupled to said structural assembly, said support assembly operative to support lights, misters or other gardening accessories above said bed.

4. A portable gardening station according to claim 3, wherein said support assembly is telescopically adjustable.

5. A portable gardening station according to claim 1, wherein a portion of said trough opposite said drain hole is a highest portion of said trough.

6. A portable gardening station according to claim 1, wherein when said structural assembly can be disassembled into components which fit inside said bed.

7. A portable gardening station according to claim 1, wherein said structural assembly comprises legs which fold against an underside of said bed.

8. A portable gardening station according to claim 1, wherein said shoulder comprises a horizontal portion extending from a wall of said bed to a vertical portion of said trough, wherein said wall, shoulder and vertical portion in combination rigidify a perimeter of said bed.

* * * * *